US012650700B2

(12) United States Patent
Hashizume et al.

(10) Patent No.: US 12,650,700 B2
(45) Date of Patent: Jun. 9, 2026

(54) MOBILE BODY MANAGEMENT DEVICE, MOBILE BODY MANAGEMENT METHOD, AND RECORDING MEDIUM STORING MOBILE BODY MANAGEMENT PROGRAM

(71) Applicant: NEC Corporation, Tokyo (JP)

(72) Inventors: Daisuke Hashizume, Tokyo (JP); Yumi Tanaka, Tokyo (JP); Takahiro Oba, Tokyo (JP); Mitsuyuki Kondo, Tokyo (JP); Hiroaki Yoshida, Tokyo (JP); Iwao Ishida, Tokyo (JP); Hiroyuki Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 18/708,251

(22) PCT Filed: Dec. 2, 2021

(86) PCT No.: PCT/JP2021/044217
§ 371 (c)(1),
(2) Date: May 8, 2024

(87) PCT Pub. No.: WO2023/100308
PCT Pub. Date: Jun. 8, 2023

(65) Prior Publication Data
US 2025/0028334 A1      Jan. 23, 2025

(51) Int. Cl.
*G05D 1/656* (2024.01)
*G05D 1/695* (2024.01)
*G05D 109/25* (2024.01)

(52) U.S. Cl.
CPC ............. *G05D 1/656* (2024.01); *G05D 1/695* (2024.01); *G05D 2109/254* (2024.01)

(58) Field of Classification Search
CPC .. G05D 1/656; G05D 1/695; G05D 2109/254; G06Q 10/063; G06Q 10/08; G06Q 30/0265; G06Q 50/265
See application file for complete search history.

(56) References Cited

U.S. PATENT DOCUMENTS 11,823,111 B2 * 11/2023 Suginishi ......... G05B 19/41865
2016/0111006 A1 * 4/2016 Srivastava ............... G05D 1/00
701/3
(Continued)

FOREIGN PATENT DOCUMENTS

JP         2017-056899 A      3/2017
JP         2017-207574 A      11/2017
(Continued)

OTHER PUBLICATIONS

Machine translation of WO/2021/064977 retrieved from Espacenet on Sep. 27, 2025 (Year: 2025).*
(Continued)

*Primary Examiner* — Thomas Ingram
(74) *Attorney, Agent, or Firm* — Sughrue Mion, PLLC

(57) ABSTRACT

A mobile body management device enables cost-effective execution of work that requires a mobile body. It includes an acceptance unit to receive work information specifying the application, time, and location. A determination unit compares this information with mobile body management data, considering storage location and availability, to select a mobile body that meets the criteria for executing the work. A control information generation unit generates instructions to control the movement of the selected mobile body based on the work application. These instructions are then transmitted to a mobile body control device to oversee the movement of the mobile body during the work. Overall, this
(Continued)

device efficiently manages and utilizes mobile bodies for various tasks while maintaining low costs.

19 Claims, 5 Drawing Sheets

(56) References Cited

U.S. PATENT DOCUMENTS

| | | | | |
|---|---|---|---|---|
| 2017/0160740 | A1* | 6/2017 | Srivastava | G08G 5/727 |
| 2017/0162064 | A1* | 6/2017 | Ubhi | G06Q 50/40 |
| 2020/0117217 | A1* | 4/2020 | Yuzawa | G06Q 10/0833 |
| 2023/0105379 | A1* | 4/2023 | Yamazaki | G08G 5/59 |
| | | | | 701/3 |
| 2024/0242165 | A1* | 7/2024 | Takeda | G06Q 10/08 |

FOREIGN PATENT DOCUMENTS

| | | |
|---|---|---|
| JP | 2019-533224 A | 11/2019 |
| JP | 2020-097393 A | 6/2020 |
| JP | 2021-028755 A | 2/2021 |
| WO | 2021/064977 A1 | 4/2021 |

OTHER PUBLICATIONS

Machine translation of JP2021028755 retrieved from Espacenet on Sep. 27, 2025 (Year: 2025).*

International Search Report for PCT Application No. PCT/JP2021/044217, mailed on Mar. 1, 2022.

English translation of Written opinion for PCT Application No. PCT/JP2021/044217, mailed on Mar. 1, 2022.

Microad, Inc., Mr. Tsuyoshi Takashiro Appointed As Creative Sirector, "MicroAd Magic!" Project #1! Starting To Provide "Sky Magic," the Next-Generation Services with Drones, Designing Space with Light and Sound, NEWS—Microad, Inc. [online], Apr. 20, 2016, Search Date Feb. 16, 2022, the Internet: <URL: https://www.microad.co.jp/news/detail/583/>, p. 1-2.

* cited by examiner

MOBILE BODY MANAGEMENT DEVICE, MOBILE BODY MANAGEMENT METHOD, AND RECORDING MEDIUM STORING MOBILE BODY MANAGEMENT PROGRAM

This application is a National Stage Entry of PCT/JP2021/044217 filed on Dec. 2, 2021, the contents of all of which are incorporated herein by reference, in their entirety.

TECHNICAL FIELD

The present invention relates to a mobile body management device, a mobile body management method, and a recording medium storing a mobile body management program.

BACKGROUND ART

In recent years, equipment that can be moved automatically, such as a drone or a robot, or by human operation (hereinafter, referred to as a mobile body in the present application) has been used in various scenes. In addition, techniques for using such a mobile body in various businesses such as logistics business and advertisement business has been developed.

As a technique related to such techniques, PTL 1 discloses a delivery drone including a motor-driven unmanned aerial vehicle. The delivery drone includes a wireless communication module that enables transmission of information to the delivery drone and reception of information from the delivery drone. The delivery drone includes at least one position specifying receiver that acquires position data indicating the position of the drone in real time or substantially real time, and a signal receiver that receives customer identification transmission signals. The delivery drone includes a delivery unit that is mounted on the delivery drone so as to store one or more articles during delivery that gives the stored articles to the customer when the delivery drone arrives at the delivery location and the customer identification transmission signal is received and authenticated.

In addition, PTL 2 discloses a flight-type in-store advertisement system that causes an unmanned aerial vehicle on which an in-store advertisement is displayed to fly according to flight route data of an in-store passage transmitted from a flight control terminal. The unmanned aerial vehicle in this system includes an aircraft-side communication means and an aircraft flight means for flying the unmanned aerial vehicle according to flight route data. The flight control terminal in this system includes a flight route setting means, a flight route data storing means, a terminal-side communication means, and a terminal-side control means.

CITATION LIST

Patent Literature

PTL 1: JP 2019-533224 W
PTL 2: JP 2017-207574 A

SUMMARY OF INVENTION

Technical Problem

As opportunities for use of a mobile body such as a drone in business operations increase, it is needed to store and manage the drone so that the drone can be used at any time in order to avoid an opportunity loss in business operations and reliably perform business operations. However, for example, if a large number of drones are kept by a business operator, the management cost of the drones increases. Therefore, it is a problem to enable steady execution of work using mobile bodies such as drones at low cost. PTL 1 and PTL 2 do not particularly mention this problem.

A main object of the present invention is to reliably perform work using a mobile body at low cost.

Solution to Problem

A mobile body management device according to an aspect of the present invention includes an acceptance means that accepts work information indicating a usage application, a usage time, and a usage location of a mobile body in work that uses the mobile body, a determination means that collates the usage time and the usage location indicated by the work information with mobile body management information indicating a storage location and an available time related to the mobile body, and determines, as a work execution mobile body for executing the work, the mobile body that is available during the usage time and for which a relationship between the usage location and the storage location satisfies a criterion, a control information generation means that generates control information for controlling movement of the work execution mobile body in the work according to the usage application indicated by the work information, and a control information transmission means that transmits the generated control information to a mobile body control device that controls the movement of the work execution mobile body.

In another viewpoint of achieving the above object, a mobile body management method, by an information processing device, according to an aspect of the present invention includes accepting work information indicating a usage application, a usage time, and a usage location of a mobile body in work that uses the mobile body, collating the usage time and the usage location indicated by the work information with mobile body management information indicating a storage location and an available time related to the mobile body and determining, as a work execution mobile body for executing the work, the mobile body that is available during the usage time and for which a relationship between the usage location and the storage location satisfies a criterion, generating control information for controlling movement of the work execution mobile body in the work according to the usage application indicated by the work information, and transmitting the generated control information to a mobile body control device that controls the movement of the work execution mobile body.

In addition, from a further viewpoint of achieving the above object, a mobile body management program according to an aspect of the present invention causes a computer to execute, an acceptance process of accepting work information indicating a usage application, a usage time, and a usage location of a mobile body in work that uses the mobile body, a determination process of collating the usage time and the usage location indicated by the work information with mobile body management information indicating a storage location and an available time related to the mobile body and determining, as a work execution mobile body for executing the work, the mobile body that is available during the usage time and for which a relationship between the usage location and the storage location satisfies a criterion, a control information generation process of generating control information for controlling movement of the work execution mobile body in the work according to the usage application indicated by the work information, and a control information transmission process of transmitting the generated control information to a mobile body control device that controls the movement of the work execution mobile body.

Furthermore, the present invention can also be achieved by a computer-readable non-volatile recording medium storing the mobile body management program (computer program).

Advantageous Effects of Invention

The present invention provides a mobile body management device and the like that enables to execute work using a mobile body steadily at low cost.

EXAMPLE EMBODIMENT

Hereinafter, example embodiments according to the present invention will be described in detail with reference to the drawings.

First Example Embodiment

Figure 1:
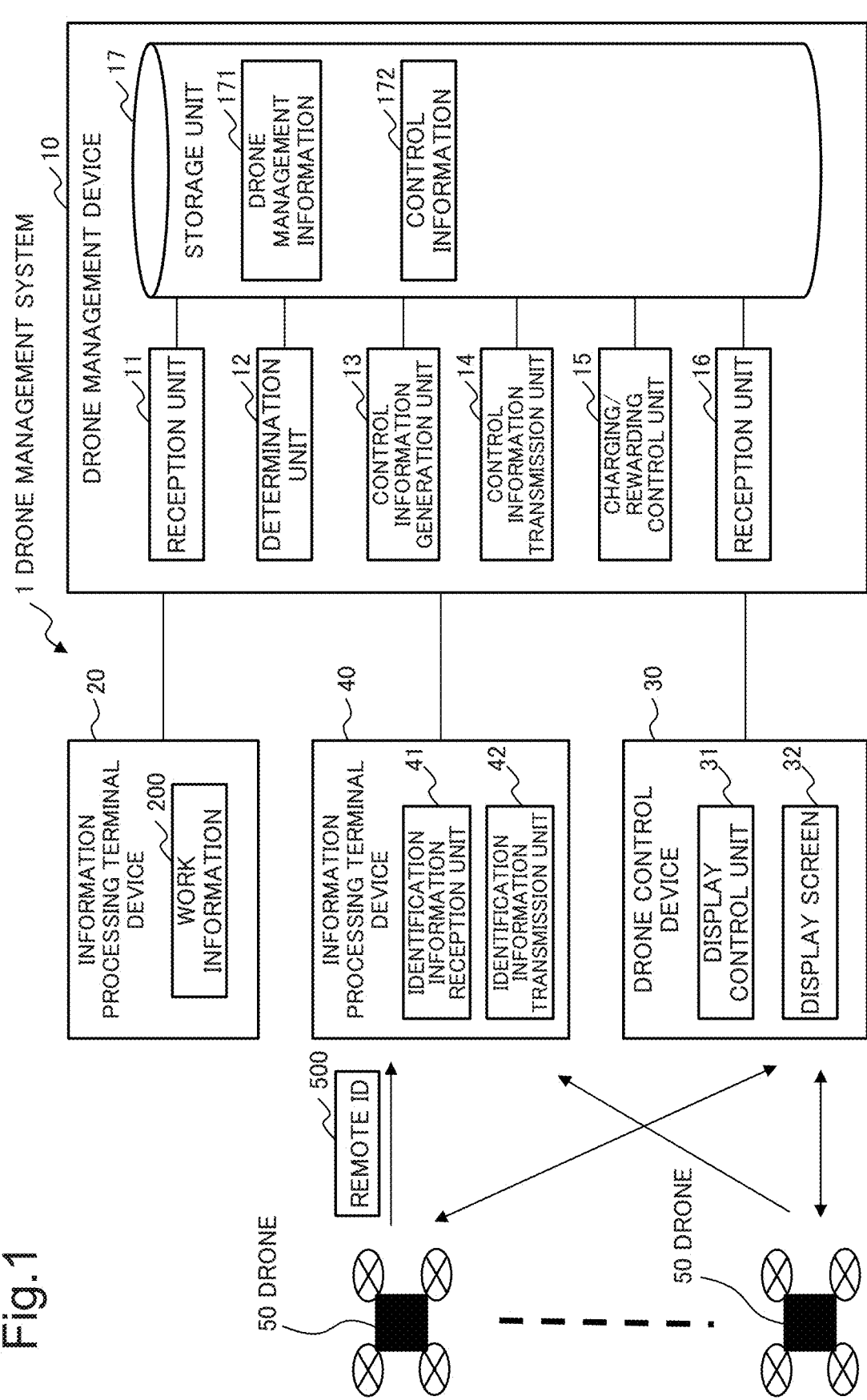
FIG. 1 is a block diagram illustrating a configuration of a drone management system 1 according to a first example embodiment of the present invention.

FIG. 1 is a block diagram illustrating a configuration of a drone management system 1 according to a first example embodiment of the present invention. The drone management system 1 according to the present example embodiment is a system that manages one or more drones 50 (an example of a mobile body) used in various business such as logistics business and advertisement business, and controls execution of work using the drone 50. Alternatively, the drone management system 1 is also intended for work using the drone 50 to provide assistance for evacuation of residents or the like in an area where a disaster or an accident has occurred.

The drone 50 to be managed in the drone management system 1 is, for example, an airframe owned (kept) by an individual, a business operator, or the like. In other words, the drone management system 1 is a system that provides a drone 50 owned by an individual, a business operator, or the like to a person (a business operator) who does not keep a drone 50 and desires to use a drone 50 for execution of a certain work.

It is assumed that the drone 50 transmits (sends) a remote ID 500. The remote ID is a mechanism that causes the drone to transmit information capable of identifying the airframe and remotely collects the identification information transmitted from the drone. The remote ID 500 includes, for example, a registration symbol, a manufacturing number, location information, time, and the like as information that can identify the drone 50. Note that the information included in the remote ID 500 is not limited to the above-described information, and may include, for example, information indicating a state of the drone 50.

The drone management system 1 mainly includes a drone management device 10, an information processing terminal device 20, a drone control device 30, and an information processing terminal device 40. The drone management device 10 and the drone control device 30 are examples of a mobile body management device and a mobile body control device in order. The information processing terminal device 20, the drone control device 30, and the information processing terminal device 40 are communicably connected to the drone management device 10 via, for example, a wireless or wired communication network.

The information processing terminal device 20 is, for example, an information processing device such as a personal computer or a smartphone. The information processing terminal device 20 receives an input operation of work information 200 indicating work by a user who desires to use the drone 50 in, for example, work in logistics business, advertisement business, or the like, or work of supporting residents in a disaster or accident occurrence region.

The work information 200 indicates a usage application, a usage time, and a usage location of the drone 50 in the work of using the drone 50. The work information 200 may also indicate the moving ability (for example, a cruising distance, a flight speed, or the like) of the drone 50 needed for execution of the work. In a case where a plurality of drones 50 is required in the execution of the work, the work information 200 may include the number of drones 50 desired to be used.

In a case where the usage application of the drone 50 in the work is the delivery work in the logistics business, the work information 200 includes, for example, information indicating the locations of the delivery source and the delivery destination, the carrying capacity (for example, the weight and size of the delivery article) required for the drone 50, and the like. In a case where the usage application of the drone 50 in the work is an advertisement work in an advertisement business, the work information 200 includes, for example, a place where an advertisement is made and information indicating what kind of advertisement is made using the drone 50. In a case where the usage application of the drone 50 in the work is work of assisting evacuation of residents in a disaster or accident occurrence region, the work information 200 includes, for example, information indicating a place where the disaster or accident has occurred, how to notify the residents of the situation of the disaster or accident using the drone 50, how to guide evacuation of the residents, and the like.

The information processing terminal device 20 transmits work information 200 input by a user who desires to use the drone 50 in work to the drone management device 10.

The drone management device 10 is an information processing device such as a server, and includes an acceptance unit 11, a determination unit 12, a control information generation unit 13, a control information transmission unit 14, a charging/rewarding control unit 15, a reception unit 16, and a storage unit 17. The acceptance unit 11, the determination unit 12, the control information generation unit 13, the control information transmission unit 14, the charging/rewarding control unit 15, and the reception unit 16 are examples of an acceptance means, a determination means, a control information generation means, a control information transmission means, a charging/rewarding control means, and a reception means in order.

The storage unit 17 is, for example, a storage device such as a random access memory (RAM) or a hard disk 904 described later with reference to FIG. 4. The storage unit 17 stores drone management information 171 and control information 172. These pieces of information stored in the storage unit 17 will be described later.

The acceptance unit 11 accepts (receives) the work information 200 transmitted from the information processing terminal device 20. The acceptance unit 11 may store the accepted work information 200 in the storage unit 17.

The determination unit 12 collates the time and location of using the drone 50 indicated by the work information 200 received by the acceptance unit 11 with the drone management information 171. The drone management information 171 is information indicating a storage location (take-off and landing place) and an available time regarding the drone 50 to be managed by the drone management device 10. The drone management information 171 may include, for example, a registration symbol included in the remote ID 500 regarding each individual drone as information for identifying each individual drone 50. The drone management information 171 may also include information indicating a moving ability, a carrying capacity, and the like regarding the drone 50 to be managed by the drone management device 10.

The drone management information 171 is updated as needed by, for example, an individual or a business operator who owns the drone 50.

In the drone management information 171, the determination unit 12 searches for the drone 50 that is in an available state at the time of using the drone 50 indicated by the work information 200 and that satisfies the criterion in the relationship between the storage location of the drone 50 indicated by the work information 200 and the location of using the drone 50 indicated by the work information 200. More specifically, for example, the determination unit 12 searches for the drone 50 satisfying that the distance between the usage location and the storage location of the drone 50 is equal to or less than a threshold value or the time required to move from the storage location to the usage location is equal to or less than a threshold value. Note that the determination unit 12 can calculate the time required for the drone 50 to move from the storage location to the usage location based on the distance between the usage location and the storage location and the flight speed of the drone 50.

For example, in a case where the work information 200 indicates the delivery work of articles, the determination unit 12 determines the drones 50 that are stored close to the delivery source and are available at the time of performing the delivery as candidates of the work execution drone (an example of a work execution mobile body) that executes the work indicated by the work information 200. For example, in a case where the work information 200 indicates advertisement work, the determination unit 12 determines the drones 50 that are stored close to the location where the advertisement is performed and are available at the time of performing the advertisement is performed as candidates for the work execution drone. For example, in a case where the work information 200 indicates work of assisting residents in a disaster or accident occurrence region, the determination unit 12 determines the drones 50 that are stored close to the disaster or accident occurrence region and are available at the time of assisting the residents as candidates for the work execution drone. Then, the determination unit 12 determines, as the work execution drone, a drone 50 most suitable for the execution of the work among the drones 50 that are candidates for the work execution drone based on the moving ability, the carrying capacity, and the like of the drone 50 necessary for the execution of the work indicated by the work information 200.

The control information generation unit 13 generates the control information 172 for controlling the movement of the work execution drone in the work indicated by the work information 200 according to the usage application of the drone 50 included in the work information 200.

For example, in a case where the usage application of the drone 50 indicated by the work information 200 is an article delivery service, the control information generation unit 13 generates the control information 172 for controlling the work execution drone so as to perform movement from the storage location of the work execution drone to return to the storage location of the work execution drone via the delivery source and the delivery destination. In this case, the control information 172 includes information indicating the time at which the work execution drone moves in the delivery of the article and the movement route.

For example, in a case where the usage application of the drones 50 indicated by the work information 200 is advertisement work, the control information generation unit 13 creates a formation indicated by the work information 200, thereby generating the control information 172 for controlling the plurality of work execution drones flying so as to display at least one of characters or pictures indicating an advertisement in the air. In this case, the control information 172 includes information indicating a positional relationship of the plurality of drones 50 for displaying characters and pictures representing the advertisement in the air. Alternatively, the control information generation unit 13 generates the control information 172 for controlling the work execution drone so as to fly on a predetermined flight route or to stop in a state of floating in a certain place, with a hanging curtain representing an advertisement.

In a case where the drone 50 executes the advertisement work indicated by the work information 200, the reception unit 16 of the drone management device 10 may receive the remote ID 500 transmitted from the drone 50 via the information processing terminal device 40.

The information processing terminal device 40 is a device (hereinafter, the device may be referred to as a remote identification terminal in the present example embodiment) having a function of collecting the remote ID 500. The information processing terminal device 40 includes an identification information reception unit 41 and an identification information transmission unit 42. The identification information reception unit 41 receives the remote ID 500 transmitted from the drone 50. Here, it is assumed that the drone 50 transmits the remote ID 500 using a communication scheme that can be received by the information processing terminal device 40. The identification information transmission unit 42 transmits the remote ID 500 received by the identification information reception unit 41 to the drone management device 10.

The charging/rewarding control unit 15 of the drone management device 10 gives a reward such as a bonus point to the owner of the information processing terminal device 40 that has transmitted the remote ID 500 received by the reception unit 16, as a reward for seeing the advertisement made by the drone 50. Here, it is assumed that the drone management device 10 can communicate with a system that manages a reward such as a bonus point of the owner of the information processing terminal device 40.

For example, in a case where the usage application of the drone 50 indicated by the work information 200 is work of assisting evacuation of residents or the like in an area where a disaster or an accident has occurred, the control information generation unit 13 generates the control information 172 for controlling the work execution drone that flies so as to collect information indicating an occurrence situation of the disaster or the accident indicated by the work information 200 from the sky and present the collected information to the residents. Here, it is assumed that the drone 50 includes a camera capable of capturing an image of an occurrence situation of the disaster or the accident and a sensor capable of collecting weather information.

The control information generation unit 13 may also generate the control information 172 for controlling the work execution drones so as to present the collected information indicating the occurrence situation of the disaster or the accident to the residents by voice or by displaying characters in the air by forming a formation. Alternatively, the control information generation unit 13 may generate the control information 172 for controlling the work execution drone so as to generate an evacuation route for the residents and guide the evacuation of the residents by moving along the evacuation route. Here, it is assumed that the control information generation unit 13 can acquire, from a communicable external device, information necessary for generating an evacuation route in the disaster or accident occurrence area.

The control information generation unit 13 may also add the remote ID 500 to a video obtained by imaging the occurrence situation of the disaster or the accident, and generate the control information 172 for controlling the work execution drone so as to transmit the video to a management system (installed in, for example, a local government or a transportation operating company) that manages the disaster or the accident. In this case, the management system has a function of specifying the detailed location of the site of occurrence of the disaster or the accident from the remote ID 500 and notifying the residents in the neighborhood of the site of occurrence of the disaster or the accident of the information on the occurrence situation of the disaster or the accident via the Internet or broadcast.

The control information transmission unit 14 transmits the control information 172 generated by the control information generation unit 13 as described above to the drone control device 30 that controls the movement of the work execution drone (drone 50). The drone control device 30 may be a device that automatically controls the flight of the drone 50, or may be a controller that receives an input operation by an operator who operates the drone 50. However, in a case where the drone control device 30 is the controller, the drone control device 30 transmits the remote ID 500 of the drone 50 to be operated to the drone management device 10 so that the drone management device 10 can identify the drone 50 to be operated.

The drone control device 30 includes a display control unit 31 and a display screen 32 in a case of being a controller that receives an input operation by an operator who operates the drone 50.

In a case where the drone control device 30 is a device that automatically performs flight control of the drone 50, the control information generation unit 13 generates the control information 172 in a data format that enables the drone control device 30 to perform flight control of the drone 50.

In this case, the drone control device 30 may be included in the drone management device 10.

In a case where the drone control device 30 is the controller described above, the control information generation unit 13 generates the control information 172 instructing the input operation. In this case, the display control unit 31 of the drone control device 30 displays the control information 172 received from the drone management device 10 on the display screen 32. In this case, the operator may operate the drone 50 to perform the work indicated by the work information 200 according to the control information 172 displayed on the display screen 32.

The charging/rewarding control unit 15 of the drone management device 10 charges the user who uses the drone 50 in the work indicated by the work information 200, and rewards the owner of the drone 50 that provides the drone 50 for the execution of the work. However, it is assumed that the drone management device 10 can communicate with a system that manages charging for the user of the drone 50 and rewarding the owner of the drone 50.

Figure 2A:
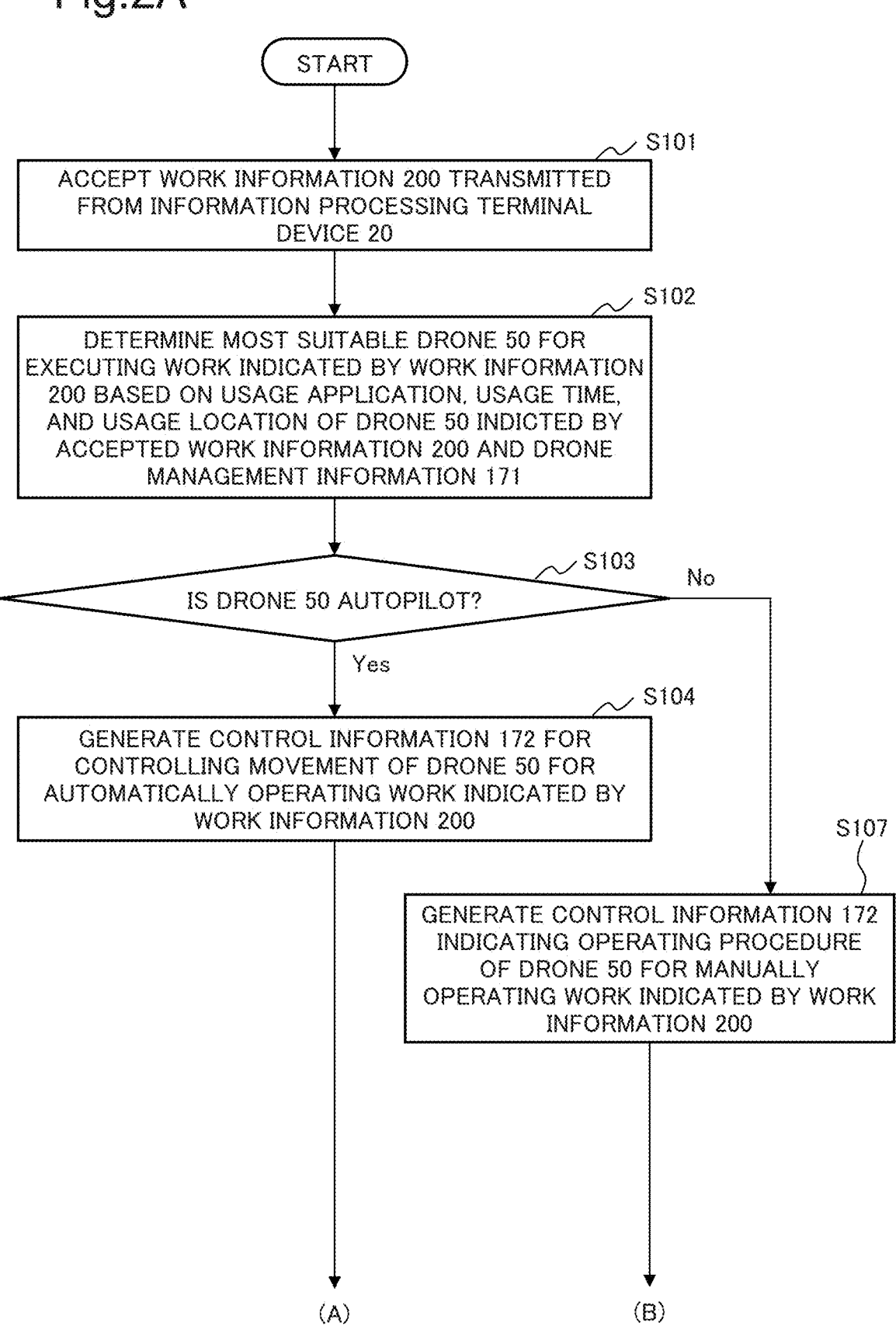
FIG. 2A is a flowchart (1/2) illustrating an operation of the drone management system 1 according to the first example embodiment of the present invention.
Figure 2B:
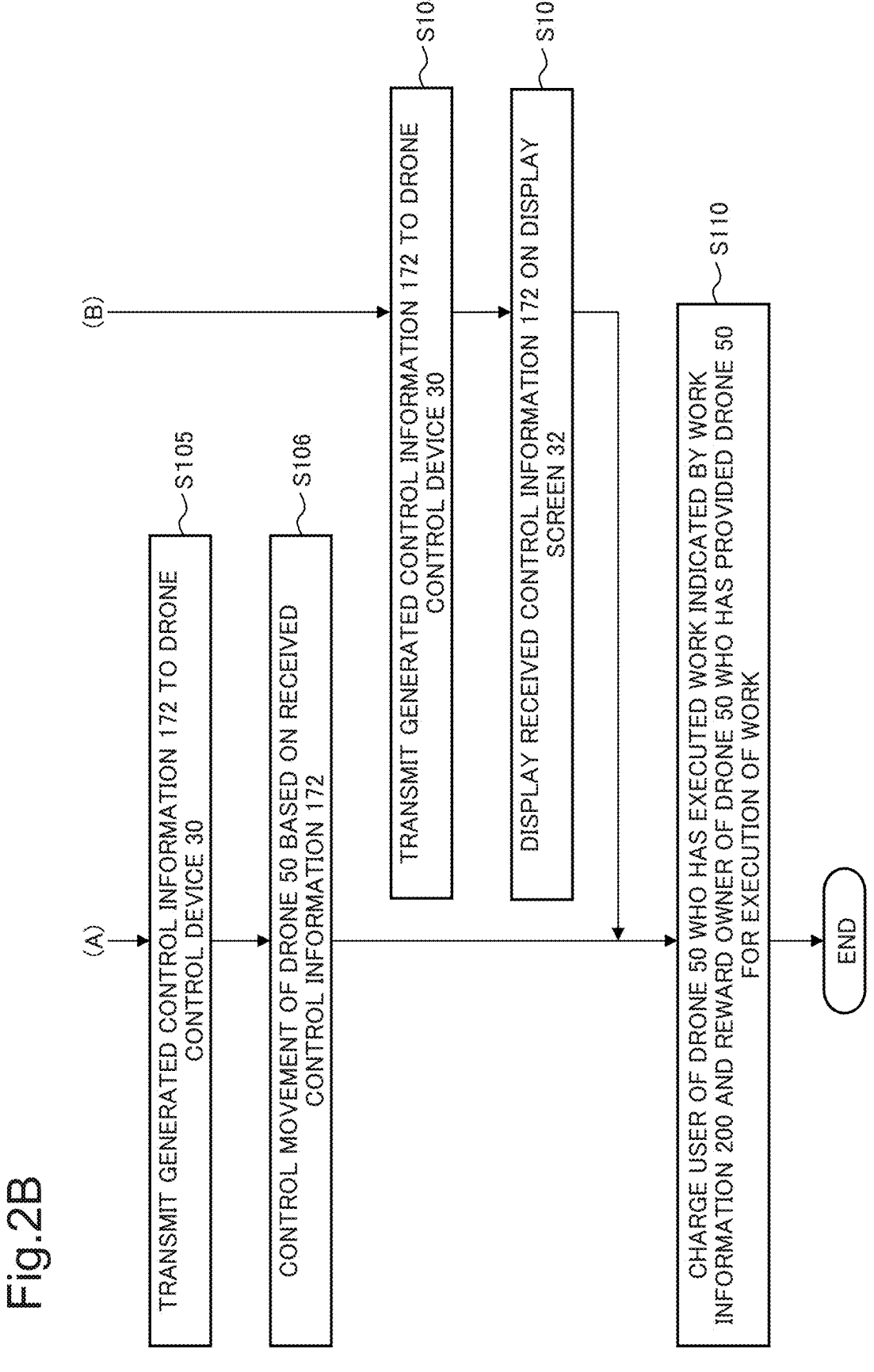
FIG. 2B is a flowchart (2/2) illustrating an operation of the drone management system 1 according to the first example embodiment of the present invention.

Next, the operation (processing) of the drone management system 1 according to the present example embodiment will be described in detail with reference to the flowcharts of FIGS. 2A and 2B.

The acceptance unit 11 of the drone management device 10 accepts the work information 200 transmitted from the information processing terminal device 20 (step S101). From the usage application, the usage time, and the usage location of the drone 50 indicated by the work information 200 received by the acceptance unit 11 and the drone management information 171, the determination unit 12 determines, as a work execution drone, a drone 50 most suitable for executing the work indicated by the work information 200 (step S102).

When the drone 50 is an autopilot (Yes in step S103), the process proceeds to step S104. When the drone 50 is not an autopilot (that is, it is operated by the operator) (No in step S103), the process proceeds to step S107.

The control information generation unit 13 generates the control information 172 for controlling the movement of the drone 50 for automatically operating the work indicated by the work information 200 (step S104). The control information transmission unit 14 transmits the control information 172 generated by the control information generation unit 13 to the drone control device 30 (step S105). The drone control device 30 controls the movement of the drone 50 based on the control information 172 received from the drone management device 10 (step S106), and the process proceeds to step S110.

The control information generation unit 13 generates the control information 172 indicating an operating procedure of the drone 50 for manually operating the work indicated by the work information 200 (step S107). The control information transmission unit 14 transmits the control information 172 generated by the control information generation unit 13 to the drone control device 30 (step S108). The display control unit 31 of the drone control device 30 displays the control information 172 received from the drone management device 10 on the display screen 32 (step S109), and the process proceeds to step S110.

After the execution of the work indicated by the work information 200 by the drone 50 is completed, the charging/rewarding control unit 15 of the drone management device 10 charges the user of the drone 50 who has executed the work and rewards the owner of the drone 50 that has provided the drone 50 for the execution of the work (step S110), and the entire processing ends.

The drone management device 10 (mobile body management device) according to the present example embodiment can achieve steady execution of the work using the drone 50 (mobile body) at low cost. This is because the drone management device 10 receives the work information 200 indicating the work using the drone 50, determines the drone 50 most suitable for the execution of the work from the usage application of the drone 50 indicated by the work information 200 and the drone management information 171, generates the control information 172 for controlling the movement of the drone 50 to execute the work, and transmits the control information 172 to the drone control device 30.

Hereinafter, effects achieved by the drone management device 10 according to the present example embodiment will be described in detail.

As opportunities for use of a mobile body such as a drone in business operations increase, it is needed to store and manage the drone so that the drone can be used at any time in order to avoid an opportunity loss in business operations and reliably perform business operations. However, for example, if a large number of drones are kept by a business operator, the management cost of the drones increases. Therefore, it is a problem to enable steady execution of work using mobile bodies such as drones at low cost.

In order to solve such a problem, the drone management device 10 according to the present example embodiment includes the acceptance unit 11, the determination unit 12, the control information generation unit 13, and the control information transmission unit 14, and operates as described above with reference to FIGS. 1 to 2B, for example. In other words, the acceptance unit 11 receives the work information 200 indicating the usage application, the usage time, and the usage location of the drone 50 in the work using the drone 50. The determination unit 12 collates the usage time and the usage location of the drone 50 indicated by the work information 200 with the drone management information 171 indicating the storage location and the available time related to the drone 50, and determines the drone 50 that is available during the usage time and for which the relationship between the usage location and the storage location satisfies the standard as the work execution drone. The control information generation unit 13 generates the control information 172 for controlling the movement of the work execution drone in the work according to the usage application indicated by the work information 200. Then, the control information transmission unit 14 transmits the generated control information 172 to the drone control device 30 that controls the movement of the work execution drone.

In other words, for example, in a case where a business operator who does not keep a drone 50 execute work using a drone 50, the drone management device 10 according to the present example embodiment determines a drone 50 suitable for executing the work among the drones 50 registered in the drone management information 171, and achieves that the determined drone 50 executes the work. As a result, since the business operator can be provided with drones 50 necessary for the execution of the work at any time without keeping the drones 50, the drone management device 10 can achieve the reliable execution of the work using the drones 50 at low cost.

In addition, the drone management device 10 according to the present example embodiment determines the drone 50 satisfying the moving ability and the carrying capacity as the work execution drone based on the work information 200 indicating the moving ability and the carrying capacity of the drone 50 necessary for the execution of the work. With this configuration, the drone management device 10 can accurately determine the drone 50 suitable for the execution of the work.

Furthermore, in a case where the work information 200 indicates advertisement work, the drone management device 10 according to the present example embodiment generates the control information 172 for controlling the plurality of flying drones 50 so as to form a formation to display at least one of characters or pictures representing the advertisement in the air. In addition, the drone management device 10 receives the remote ID 500 from the information processing terminal device 40 that has received the remote ID 500 transmitted from the drone 50, and gives a reward such as a bonus point to the owner of the information processing terminal device 40 that has transmitted the remote ID 500. With this configuration, the drone management device 10 can enhance the advertising effect in the advertisement work using the drone 50.

In addition, in a case where the work information 200 indicates assistance of residents in a disaster occurrence region, the drone management device 10 according to the present example embodiment generates the control information 172 for controlling the flying drone 50 so as to collect information indicating a disaster occurrence situation from the sky and present the collected information to the residents. In addition, the drone management device 10 generates the control information 172 for controlling the drones 50 so as to present the information collected regarding the disaster to the residents by voice or by displaying characters in the air by forming a formation. Then, the drone management device 10 generates an evacuation route for the residents, and generates control information 172 for controlling the drone 50 so as to move along the evacuation route. Therefore, the drone management device 10 can achieve accurate support for the residents in the disaster occurrence region using the drone 50.

Furthermore, the information that can identify the drone 50 collected by the information processing terminal device 40 is not limited to the remote ID 500. The information processing terminal device 40 may collect information that can identify the drone 50 having a specification different from that of the remote ID 500.

Furthermore, the drone management system 1 (mobile body management system) may manage a mobile body other than the drone 50. The drone management system 1 may manage, for example, a robot that is movable and capable of executing the work indicated by the work information 200.

Second Example Embodiment

Figure 3:
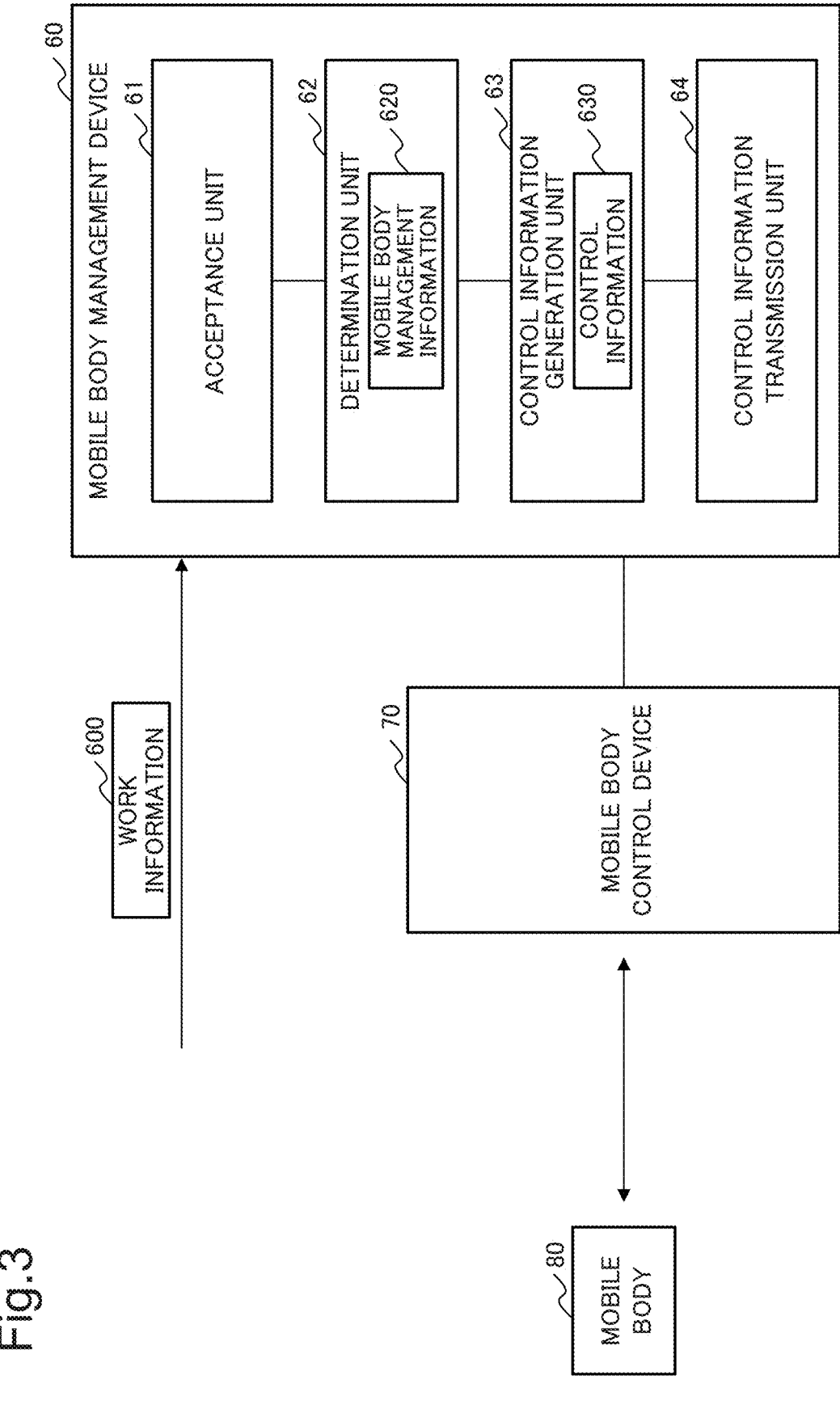
FIG. 3 is a block diagram illustrating a configuration of a mobile body management device 60 according to a second example embodiment of the present invention.

FIG. 3 is a block diagram illustrating a configuration of a mobile body management device 60 according to a second example embodiment of the present invention. The mobile body management device 60 includes an acceptance unit 61, a determination unit 62, a control information generation unit 63, and a control information transmission unit 64. However, the acceptance unit 61, the determination unit 62, the control information generation unit 63, and the control information transmission unit 64 are examples of an acceptance means, a determination means, a control information generation means, and a control information transmission means in order.

The acceptance unit 61 receives work information 600 indicating a usage application, a usage time, and a usage location of the mobile body 80 in work using the mobile body 80. The mobile body 80 is, for example, a mobile device such as the drone 50 according to the first example embodiment. The work information 600 is, for example, information similar to the work information 200 according to the first example embodiment. For example, the acceptance unit 61 operates similarly to the acceptance unit 11 according to the first example embodiment.

The determination unit 62 collates the usage time and the usage location of the mobile body 80 indicated by the work information 600 with the mobile body management information 620 indicating the storage location and the available time related to the mobile body 80, and determines the mobile body 80 that is available during the usage time and for which the relationship between the usage location and the storage location satisfies a criterion as the work execution mobile body that executes the work. The mobile body management information 620 is, for example, information similar to the drone management information 171 according to the first example embodiment. For example, the determination unit 62 operates similarly to the determination unit 12 according to the first example embodiment.

The control information generation unit 63 generates the control information 630 for controlling the movement of the work execution mobile body in the work according to the usage application indicated by the work information 600. The control information 630 is, for example, information similar to the control information 172 according to the first example embodiment. The control information generation unit 63 operates similarly to the control information generation unit 13 according to the first example embodiment, for example.

The control information transmission unit 64 transmits the generated control information 630 to the mobile body control device 70 that controls the movement of the work execution mobile body. The mobile body control device 70 is, for example, a device that operates similarly to the drone control device 30 according to the first example embodiment. The control information transmission unit 64 operates similarly to the control information transmission unit 14 according to the first example embodiment, for example.

The mobile body management device 60 according to the present example embodiment can achieve steady execution of work using the mobile body 80 at low cost. This is because the mobile body management device 60 receives the work information 600 indicating the work using the mobile body 80, determines the mobile body 80 most suitable for the execution of the work from the usage application of the mobile body 80 indicated by the work information 600 and the mobile body management information 620, generates the control information 630 for controlling the movement of the mobile body 80 to execute the work, and transmits the control information 630 to the mobile body control device 70.

Hardware Configuration Example

Each unit in the drone management device 10, the drone control device 30, and the information processing terminal device 40 illustrated in FIG. 1 or the mobile body management device 60 illustrated in FIG. 3 in each of the above-described example embodiments can be achieved by dedicated hardware (HW) (electronic circuit). In FIGS. 1 and 3, at least the following configuration can be regarded as a functional (processing) unit (software module) of a software program.

The acceptance units 11 and 61,
the determination units 12 and 62,
the control information generation units 13 and 63,
the control information transmission units 14 and 64, the charging/rewarding control unit 15
the reception unit 16,
the storage control function in the storage unit 17,
the display control unit 31,
the identification information reception unit 41, and
the identification information transmission unit 42.

However, the division of each unit illustrated in these drawings is the configurations for convenience of description, and various configurations can be assumed at the time of implementation. An example of a hardware environment in this case will be described with reference to FIG. 4.

Figure 4:
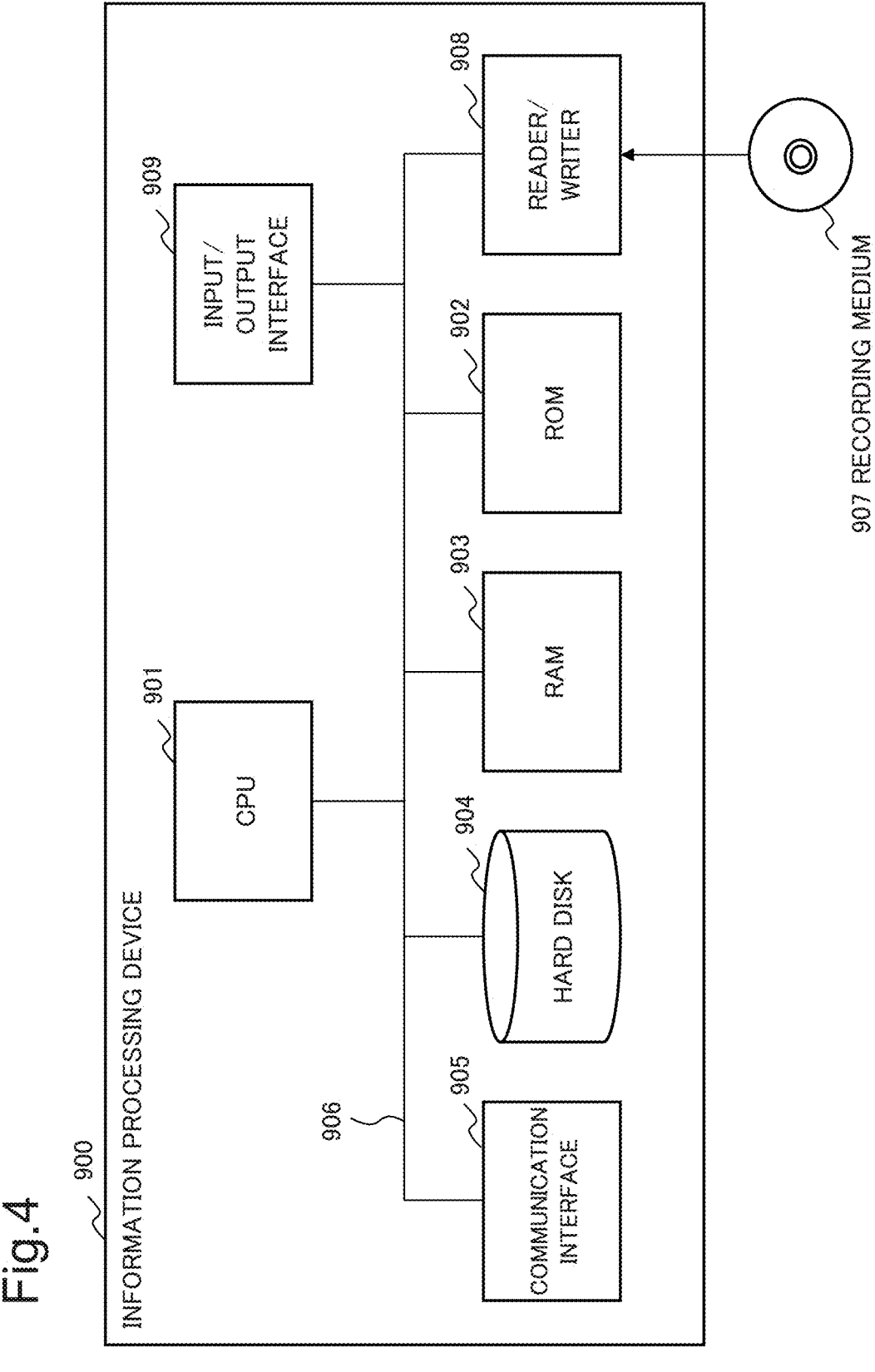
FIG. 4 is a block diagram illustrating a configuration of an information processing device 900 that enables a drone management device 10 and the mobile body management device 60 according to each example embodiment of the present invention.

FIG. 4 is a diagram exemplarily describing a configuration of an information processing device 900 (computer system) capable of achieving the drone management device 10 according to the first example embodiment or the mobile body management device 60 according to the second example embodiment of the present invention. In other words, FIG. 4 is a configuration of at least one computer (information processing device) capable of achieving each of the above-described devices illustrated in FIGS. 1 and 3, and represents a hardware environment capable of achieving each function in the above-described example embodiment.

The information processing device 900 illustrated in FIG. 4 includes the following components as components, but may not include some of the following components.

A central processing unit (CPU) 901,
a read only memory (ROM) 902,
a random access memory (RAM) 903,
a hard disk (storage device) 904,
a communication interface 905 for communicating with an external device,
a bus 906 (communication line),
a reader/writer 908 capable of reading and writing data stored in a recording medium 907 such as a compact disc read only memory (CD-ROM), and
an input/output interface 909 such as a monitor, a speaker, or a keyboard.

In other words, the information processing device 900 including the above-described components is a general computer to which these components are connected via the bus 906. The information processing device 900 may include a plurality of CPUs 901 or may include the CPU 901 configured by multiple cores. The information processing device 900 may include a graphical processing unit (GPU) (not illustrated) in addition to the CPU 901.

Then, the present invention described using the above-described example embodiments as an example provides a computer program capable of achieving the following function to the information processing device 900 illustrated in FIG. 4. The function is the above-described configuration in the block configuration diagram (FIGS. 1 and 3) referred to in the description of the example embodiments or the function of the flowcharts (FIGS. 2A and 2B). Thereafter, the present invention is achieved by reading, interpreting, and executing the computer program on the CPU 901 in the hardware. The computer program supplied in the device may be stored in a readable/writable volatile memory (RAM 903) or a nonvolatile storage device such as the ROM 902 or the hard disk 904.

Furthermore, in the above case, a general procedure can be adopted at present as a method of supplying the computer program into the hardware. Examples of the procedure include a method of installing the program in the device via various recording medium 907 such as a CD-ROM, a method of downloading the program from the outside via a communication line such as the Internet, and the like. In such a case, the present invention can be understood to be constituted by a code constituting the computer program or the recording medium 907 storing the code.

The present invention has been described above using the above-described example embodiments as exemplary examples. However, the present invention is not limited to the above-described example embodiments. In other words, the present invention can apply various aspects that can be understood by those skilled in the art within the scope of the present invention.

Note that some or all of the above-described example embodiments can also be described as the following supplementary notes. However, the present invention exemplarily described by the above-described example embodiments is not limited to the following.

(Supplementary Note 1)

A mobile body management device including:

an acceptance means that accepts work information indicating a usage application, a usage time, and a usage location of a mobile body in work that uses the mobile body;

a determination means that collates the usage time and the usage location indicated by the work information with mobile body management information indicating a storage location and an available time related to the mobile body, and determines, as a work execution mobile body for executing the work, the mobile body that is available during the usage time and for which a relationship between the usage location and the storage location satisfies a criterion;

a control information generation means that generates control information for controlling movement of the work execution mobile body in the work according to the usage application indicated by the work information; and a control information transmission means that transmits the generated control information to a mobile body control device that controls the movement of the work execution mobile body.

(Supplementary Note 2)

The mobile body management device according to Supplementary Note 1, in which the determination means determines, as the work execution mobile body, the mobile body for which a distance between the usage location and the storage location is equal to or less than a threshold value, or a time required to move from the storage location to the usage location is equal to or less than a threshold value.

(Supplementary Note 3)

The mobile body management device according to Supplementary Note 1 or 2, in which the work information further indicates a moving ability of the mobile body needed for execution of the work, and the determination means determines, as the work execution mobile body, the mobile body satisfying the moving ability.

(Supplementary Note 4)

The mobile body management device according to any one of Supplementary Notes 1 to 3, further including a charging/rewarding control means that charges a user who uses the work execution mobile body in the work and rewards an owner of the work execution mobile body who provides the work execution mobile body.

(Supplementary Note 5)

The mobile body management device according to any one of Supplementary Notes 1 to 4, in which the mobile body is a drone, and the mobile body management information includes a remote ID capable of identifying the mobile body.

(Supplementary Note 6)

The mobile body management device according to any one of Supplementary Notes 1 to 5, in which in a case where the usage application indicated by the work information is a delivery of an article, the determination means determines, as the work execution mobile body, the mobile body that is available at a time of the delivery and is stored in a location closest to a delivery source, and the control information generation means generates the control information for controlling the work execution mobile body to perform movement, from the storage location of the work execution mobile body, to return to the storage location of the work execution mobile body via the delivery source and a delivery destination.

(Supplementary Note 7)

The mobile body management device according to Supplementary Note 6, in which the work information further indicates a carrying capacity of the mobile body needed for execution of the work, and the determination means determines, as the work execution mobile body, the mobile body satisfying the carrying capacity.

(Supplementary Note 8)

The mobile body management device according to any one of Supplementary Notes 1 to 5, in which in a case where the usage application indicated by the work information is advertisement work, the control information generation means generates the control information for controlling a plurality of the work execution mobile bodies that fly in such a way as to form a formation to display at least one of a character and a picture representing an advertisement in the air.

(Supplementary Note 9)

The mobile body management device according to Supplementary Note 4, further including a reception means that receives, when the usage application indicated by the work information is advertisement work, mobile body identification information from an information processing terminal device that has received the mobile body identification information capable of identifying the work execution mobile body, the mobile body identification information being transmitted from the work execution mobile body, wherein the charging/rewarding control means rewards the owner of the information processing terminal device that has transmitted the mobile body identification information.

(Supplementary Note 10)

The mobile body management device according to any one of Supplementary Notes 1 to 5, in which in a case where the usage application indicated by the work information is to assist residents in a disaster occurrence region, the determination means determines, as the work execution mobile body, the mobile body that is available at a time when the assistance of the residents is to be provided and is stored in a location closest to the disaster occurrence region, and the control information generation means generates the control information for controlling the work execution mobile body that flies in such a way as to collect information indicating a disaster occurrence situation from a sky and present the collected information to the residents.

(Supplementary Note 11)

The mobile body management device according to Supplementary Note 10, in which the control information generation means generates the control information for controlling the work execution mobile bodies in such a way as to present the collected information to the residents by voice or by forming a formation to display a character in the air.

(Supplementary Note 12)

The mobile body management device according to Supplementary Note 10 or 11, in which the control information generation means generates an evacuation route for the residents, and generates the control information for controlling the work execution mobile body to move along the evacuation route.

(Supplementary Note 13)

A mobile body management method, by an information processing device, including:

accepting work information indicating a usage application, a usage time, and a usage location of a mobile body in work that uses the mobile body;

collating the usage time and the usage location indicated by the work information with mobile body management information indicating a storage location and an available time related to the mobile body and determining, as a work execution mobile body for executing the work, the mobile body that is available during the usage time and for which a relationship between the usage location and the storage location satisfies a criterion;

generating control information for controlling movement of the work execution mobile body in the work according to the usage application indicated by the work information; and transmitting the generated control information to a mobile body control device that controls the movement of the work execution mobile body.

(Supplementary Note 14)

A recording medium storing a mobile body management program for causing a computer to execute:

an acceptance process of accepting work information indicating a usage application, a usage time, and a usage location of a mobile body in work that uses the mobile body;

a determination process of collating the usage time and the usage location indicated by the work information with mobile body management information indicating a storage location and an available time related to the mobile body and determining, as a work execution mobile body for executing the work, the mobile body that is available during the usage time and for which a relationship between the usage location and the storage location satisfies a criterion;

a control information generation process of generating control information for controlling movement of the work execution mobile body in the work according to the usage application indicated by the work information; and a control information transmission process of transmitting the generated control information to a mobile body control device that controls the movement of the work execution mobile body.

REFERENCE SIGNS LIST 1 drone management system
10 drone management device 11 acceptance unit
12 determination unit
13 control information generation unit
14 control information transmission unit
15 charging/rewarding control unit
16 reception unit
17 storage unit
171 drone management information
172 control information
20 information processing terminal device
200 work information
30 drone control device
31 display control unit
32 display screen
40 information processing terminal device
41 identification information reception unit
42 identification information transmission unit
50 drone
500 remote ID
60 mobile body management device
600 work information
61 acceptance unit
62 determination unit
620 mobile body management information
63 control information generation unit
630 control information
64 control information transmission unit
70 mobile body control device
80 mobile body
900 information processing device
901 CPU
902 ROM
903 RAM
904 hard disk (storage device)
905 communication interface
906 bus
907 recording medium
908 reader/writer
909 input/output interface

What is claimed is:

1. A mobile body management device comprising:

at least one memory storing a computer program; and at least one processor configured to execute the computer program to:

accept work information indicating a usage application, a usage time, and a usage location of a mobile body in work that uses the mobile body;

collate the usage time and the usage location indicated by the work information with mobile body management information indicating a storage location and an available time related to the mobile body;

determine, as a work execution mobile body for executing the work, the mobile body that is available during the usage time and for which a relationship between the usage location and the storage location satisfies a criterion;

generate control information for controlling movement of the work execution mobile body in the work according to the usage application indicated by the work information;

transmit the generated control information to a mobile body control device that controls the movement of the work execution mobile body; and in a case where the usage application indicated by the work information is advertisement work, generate the control information for controlling a plurality of the work execution mobile bodies that fly in such a way as to form a formation to display at least one of a character and a picture representing an advertisement in the air.

2. The mobile body management device according to claim 1, wherein the processor is configured to execute the computer program to determine, as the work execution mobile body, the mobile body for which a distance between the usage location and the storage location is equal to or less than a threshold value, or a time required to move from the storage location to the usage location is equal to or less than a threshold value.

3. The mobile body management device according to claim 1, wherein the work information further indicates a moving ability of the mobile body needed for execution of the work, and wherein the processor is configured to execute the computer program to determine, as the work execution mobile body, the mobile body satisfying the moving ability.

4. The mobile body management device according to claim 1, wherein the processor is configured to execute the computer program to charge a user who uses the work execution mobile body in the work and reward an owner of the work execution mobile body who provides the work execution mobile body.

5. The mobile body management device according to claim 4, wherein the processor is configured to execute the computer program to:

receive, when the usage application indicated by the work information is advertisement work, mobile body identification information from an information processing terminal device that has received the mobile body identification information capable of identifying the work execution mobile body, the mobile body identification information being transmitted from the work execution mobile body; and reward the owner of the information processing terminal device that has transmitted the mobile body identification information.

6. The mobile body management device according to claim 1, wherein the mobile body is a drone, and wherein the mobile body management information includes a remote ID capable of identifying the mobile body.

7. The mobile body management device according to claim 1, wherein the processor is configured to execute the computer program to, to:

in a case where the usage application indicated by the work information is a delivery of an article, determine, as the work execution mobile body, the mobile body that is available at a time of the delivery and is stored in a location closest to a delivery source; and generate the control information for controlling the work execution mobile body to perform movement, from the storage location of the work execution mobile body, to return to the storage location of the work execution mobile body via the delivery source and a delivery destination.

8. The mobile body management device according to claim 7, wherein the work information further indicates a carrying capacity of the mobile body needed for execution of the work, and wherein the processor is configured to execute the computer program to determine, as the work execution mobile body, the mobile body satisfying the carrying capacity.

9. The mobile body management device according to claim 1, wherein the processor is configured to execute the computer program to:

in a case where the usage application indicated by the work information is to assist residents in a disaster occurrence region, determine, as the work execution mobile body, the mobile body that is available at a time when the assistance of the residents is to be provided and is stored in a location closest to the disaster occurrence region; and generate the control information for controlling the work execution mobile body that flies in such a way as to collect information indicating a disaster occurrence situation from a sky and present the collected information to the residents.

10. The mobile body management device according to claim 9, wherein the processor is configured to execute the computer program to generate the control information for controlling the work execution mobile bodies in such a way as to present the collected information to the residents by voice or by forming a formation to display a character in the air.

11. The mobile body management device according to claim 9, wherein the processor is configured to execute the computer program to generate an evacuation route for the residents, and generate the control information for controlling the work execution mobile body to move along the evacuation route.

12. A mobile body management method, by an information processing device, the mobile body management method comprising:

accepting work information indicating a usage application, a usage time, and a usage location of a mobile body in work that uses the mobile body;

collating the usage time and the usage location indicated by the work information with mobile body management information indicating a storage location and an available time related to the mobile body and determining, as a work execution mobile body for executing the work, the mobile body that is available during the usage time and for which a relationship between the usage location and the storage location satisfies a criterion;

generating control information for controlling movement of the work execution mobile body in the work according to the usage application indicated by the work information; and transmitting the generated control information to a mobile body control device that controls the movement of the work execution mobile body; and in a case where the usage application indicated by the work information is advertisement work, generating the control information for controlling a plurality of the work execution mobile bodies that fly in such a way as to form a formation to display at least one of a character and a picture representing an advertisement in the air.

13. The mobile body management method according to claim 12, further comprising determining, as the work execution mobile body, the mobile body for which a distance between the usage location and the storage location is equal to or less than a threshold value, or a time required to move from the storage location to the usage location is equal to or less than a threshold value.

14. The mobile body management method according to claim 12, further comprising determining, as the work execution mobile body, the mobile body satisfying the moving ability, wherein the work information further indicates a moving ability of the mobile body needed for execution of the work.

15. The mobile body management method according to claim 12, further comprising charging a user who uses the work execution mobile body in the work and rewarding an owner of the work execution mobile body who provides the work execution mobile body.

16. A non-transitory computer-readable recording medium storing a mobile body management program for causing a computer to execute:

an acceptance process comprising accepting work information indicating a usage application, a usage time, and a usage location of a mobile body in work that uses the mobile body;

a determination process comprising collating the usage time and the usage location indicated by the work information with mobile body management information indicating a storage location and an available time related to the mobile body and determining, as a work execution mobile body for executing the work, the mobile body that is available during the usage time and for which a relationship between the usage location and the storage location satisfies a criterion;

a control information generation process comprising generating control information for controlling movement of the work execution mobile body in the work according to the usage application indicated by the work information;

a control information transmission process comprising transmitting the generated control information to a mobile body control device that controls the movement of the work execution mobile body; and in a case where the usage application indicated by the work information is advertisement work, generating the control information for controlling a plurality of the work execution mobile bodies that fly in such a way as to form a formation to display at least one of a character and a picture representing an advertisement in the air.

17. The non-transitory computer-readable recording medium storing a mobile body management program according to claim 16 for causing the computer to further execute the determination process comprising determining, as the work execution mobile body, the mobile body for which a distance between the usage location and the storage location is equal to or less than a threshold value, or a time required to move from the storage location to the usage location is equal to or less than a threshold value.

18. The non-transitory computer-readable recording medium storing the mobile body management program according to claim 16 for causing the computer to further execute the determination process comprising determining, as the work execution mobile body, the mobile body satisfying the moving ability, Wherein the work information further indicates a moving ability of the mobile body needed for execution of the work.

19. The non-transitory computer-readable recording medium storing the mobile body management program according to claim 16 for causing the computer to further execute a charging/rewarding process comprising charging a user who uses the work execution mobile body in the work and rewarding an owner of the work execution mobile body who provides the work execution mobile body.

\* \* \* \* \*